March 26, 1940.  E. H. MUELLER  2,194,714
LOCKING VALVE
Filed Feb. 6, 1939  2 Sheets-Sheet 1
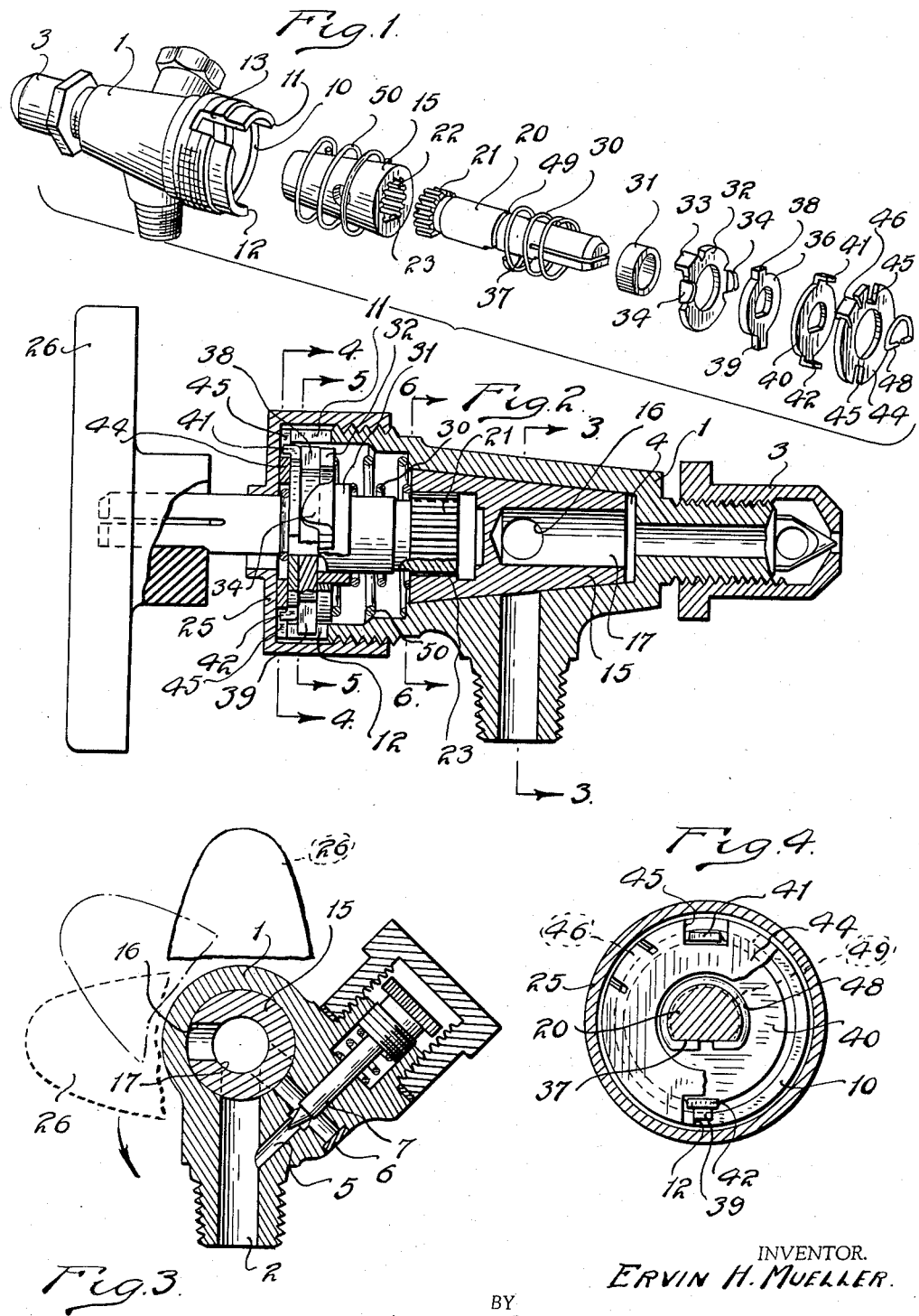
INVENTOR.
ERVIN H. MUELLER.
BY
Barnes, Kisselle, Laughlin & Raisch
ATTORNEYS.

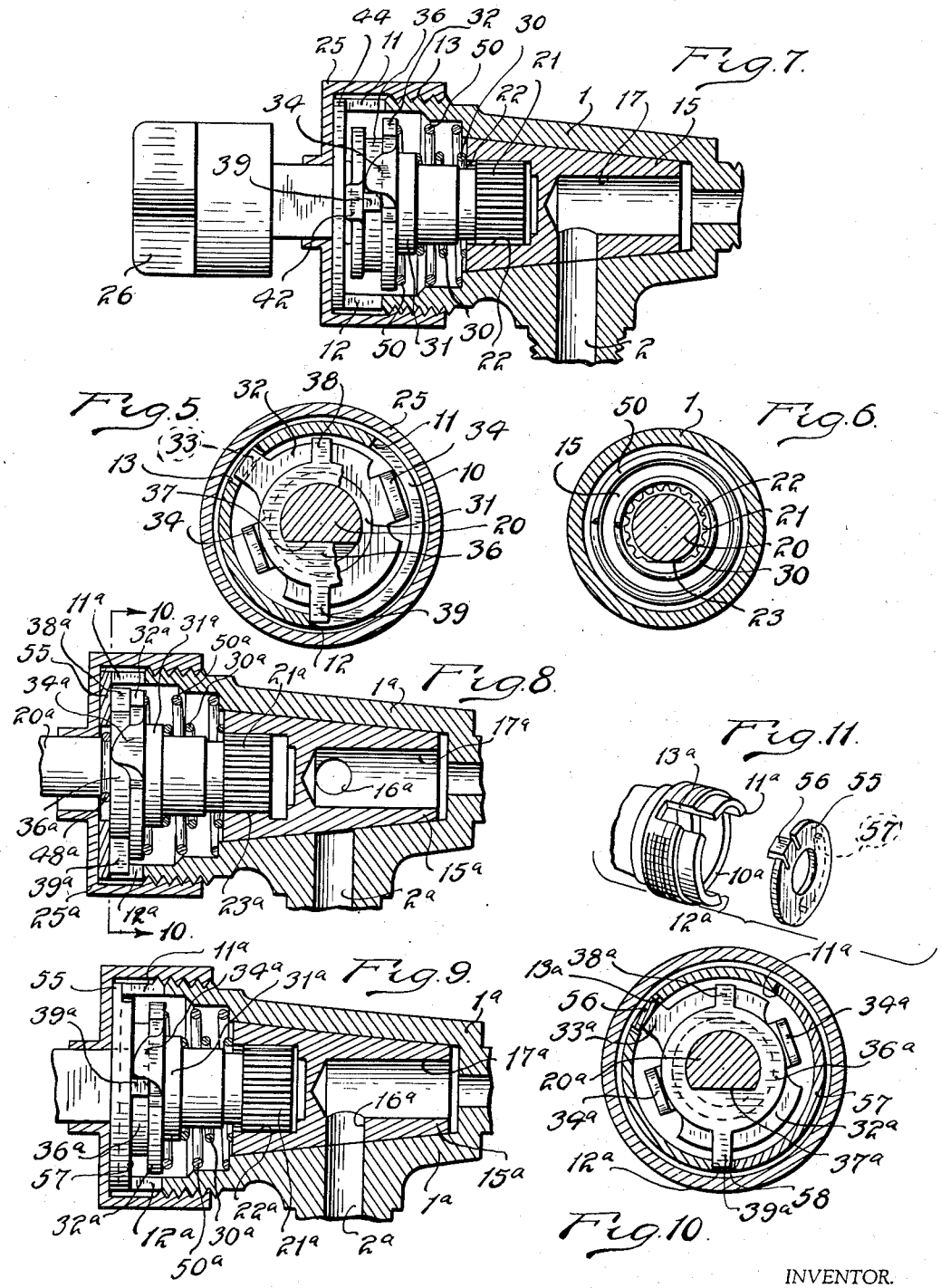

Patented Mar. 26, 1940

2,194,714

UNITED STATES PATENT OFFICE 2,194,714

LOCKING VALVE

Ervin H. Mueller, Grosse Pointe, Mich.

Application February 6, 1939, Serial No. 254,845

7 Claims. (Cl. 251—165)

This invention relates to a valve structure, and has to do especially with a valve structure suitable for use on a gas cock. The general objects of the invention are the provision of a valve which has at least two "on" positions for different rates of flow, with means for exerting a controlling action at an intermediate position, while at the same time the valve is locked against movement in "off" position. A valve of this type having two "on" positions is shown in my Patent No. 2,142,368 of January 3, 1939. The present valve embodies a different organization and assembly of elements, including an operating stem which is shiftable relative to the valve member and parts which are movable with the stem in such shift for the purpose of locking and unlocking the valve in "off" position.

Two different structures are shown in the accompanying drawings for carrying out the invention, and these will be specifically described below.

Fig. 1 is a view of various parts of the valve with the parts separated and arranged to illustrate the manner of assembly.

Fig. 2 is an enlarged cross sectional view taken through a valve comprising the parts shown in Fig. 1, with the valve shown in "off" position.

Fig. 3 is a cross sectional view taken substantially on line 3—3 of Fig. 2 showing the ports and passageways.

Fig. 4 is a cross sectional view taken substantially on line 4—4 of Fig. 2 showing the locking plate with the locking plate broken away to illustrate underlying parts.

Fig. 5 is a sectional view taken substantially on line 5—5 of Fig. 2 showing some of the movable control members.

Fig. 6 is a sectional view taken substantially on line 6—6 of Fig. 2 showing the connection between a valve member and the stem.

Fig. 7 is a sectional view on a somewhat smaller scale but similar to Fig. 2 showing the valve in one "on" position.

Fig. 8 is a sectional view of a modified form of the parts in "off" position.

Fig. 9 is a sectional view similar to Fig. 8 showing one "on" position.

Fig. 10 is a sectional view taken substantially on line 10—10 of Fig. 8 showing the locking arrangement.

Fig. 11 is a view illustrating a portion of the valve body and a locking member in separated relation and illustrating the manner of assembly.

The valve body is generally indicated at 1 having an inlet 2 and an outlet 3, both of which lead into a valve chamber 4, the outlet including an attached jet as shown in Fig. 2. The valve also has a by-pass comprising passageways 5 and 6 leading from the passageway 2 to the valve chamber 4 and controlled by an adjustable needle valve 7. The valve body is cut away to provide a notch 10 defined by shoulders 11 and 12, and it also has a slot 13.

In the valve chamber a tapered valve plug 15 is seated and it has a port 16 leading to an axial passageway 17. A stem 20 has a serrated end 21 for fitting into an internally serrated recess 22 in the plug, and the stem and recess preferably are formed so that they may be fitted together in only one position, such formation being in the nature of cooperating flat portions 23, as shown in Fig. 6. The stem extends through a cap 25 screw-threaded to the body and is arranged to receive a handle 26.

Several parts, as shown in Fig. 1, are assembled over the stem. These parts include a relatively small coil spring 30, which acts upon the plug, a sleeve 31, a cam washer 32 which has a key 33 for fitting in the slot 13 and two cam elements 34 preferably shaped to provide a slow lift cam face on one side and a quick lift cam face on the other. The stem is rotatable relative to the cam washer. Another washer 36 is non-rotatably disposed on the stem due to the flat or D-formation illustrated, the stem having a similar cross sectional shape provided by the flattened surface 37. This washer has two projections, a relatively small projection 38 and a longer projection 39. A locking washer 40 is also mounted to rotate with the stem and it has two rearwardly extending keys 41 and 42. A retaining washer 44 having two retaining or locking notches 45 and a key 46 is also mounted over the stem with the key 46 engaging in the slot 13. A split spring ring 48 is snapped into a groove 49 in the stem, and this ring is of such proportions as to freely pass through the aperture in the washer 44 but engages against the side of the locking washer 40. When these parts are assembled on the stem they lie substantially in the order shown in Fig. 1. The spring 30 holds the plug valve member on its seat and reacts through the sleeve 31, which passes through the washer 32, and through washers 36 and 40, and through the snap ring 48 which reacts against the cap. The washer 44 is engaged between the cap and the end of the valve body. A larger spring 50 is disposed in the large portion of the valve body and one end takes against the valve body as shown in Fig. 2, while the other end presses against the cam washer 32.

When the parts are properly assembled and the valve is in "off" position, as shown in the full lines of Fig. 3, the projection 39 lies against the shoulder 12, as shown in Fig. 2. The projection functions in the slot 10 and limits the rotation of the valve member. At this time the keys 41 and 42 of the locking washer are in the locking recesses 45 of the retaining washer. The small spring 30 holds the locking washer against the retaining washer, and the large spring 50 yieldably positions the cam washer 32 against the washer 36. It will be seen that the valve cannot be turned at this time. Any attempt to rotate the stem and valve is prevented because of the keys 41 and 42 lying in recesses 45 and the retaining washer 44 being keyed to the valve body. In order to turn the valve to an "on" position, the stem is pushed inwardly with the action of both springs until the keys 41 and 42 move out of the notches 45. Now the valve may be turned counter-clockwise as Fig. 3 is viewed, and the washers 40 and 36 also turn with the valve.

The projection 39 comes into contact with one cam 34 and a projection 38 comes into contact with the other cam substantially as illustrated in Fig. 7. These projections strike the quick lift faces of the cam and the valve is stopped in full "on" position as shown by one set of dotted lines in Fig. 3, with the port 16 lining up with the inlet 2. At this time the keys 41 and 42 slide along the surfaces of the retaining washer 44. By applying additional turning torque, the projections force the cam washer 36 to the right, as Fig. 7 is viewed, against the action of the spring 50, and then continued rotation positions the valve in another "on" position with the port 16 lining up with passage 6 as shown by the other set of dotted lines in Fig. 3. At this time the projection 39 abuts the shoulder 11. To turn the valve off it is merely rotated clockwise until the projection 39 strikes shoulder 12, at which time the stem shifts axially due to the action of the springs, and the keys 41 and 42 are seated in the locking notches 45. In this turning off action the projections 38 and 39 move easily across the cams 34 because they engage the cams on the slow lift faces.

In the modified form shown in Figs. 8 to 11, many of the same parts are used, and to avoid detailed re-description the same reference characters are employed with the additional character a. Briefly, the valve plug 15a fits in the bore of the body and the stem 20a has a sliding engagement with the plug at 21a, and there is the same arrangement of springs 30a and 50a. The sleeve 31a is used, also the cam washer 32a and the controlling washer 36a with its projections 38a and 39a, and the snap ring 48a. One other additional part is used, namely, a retaining washer 55 keyed to the body by a key 56 which extends into the slot 13a (Fig. 11). This washer seats on top of the valve body 1a, and it has an axially directed partial flange 57 which extends into the recess 10a of the body. The flange, however, is shorter in circumferential extent than the extent of the slot 10a, with the result that a locking notch 58 is formed between one edge of the flange and the shoulder 12a. This notch is of such width as to receive the projection 39a. When the valve is "off," as shown in Fig. 8, the washer 36a is urged up against the locking washer 55 by the springs, with the projection 39a in the slot 58. In order to the turn the valve "on," the stem must be pushed inwardly compressing the springs a sufficient distance to cause the projection 39a to move out of the slot 58. By reference to Fig. 9 it will be noted that the partial flange 57 has a relatively short axial extent so that there is adequate room for the rotary movements of the washer 36a and its projection 39a rotatably after the projection has been moved out of the notch 58. The valve may now be turned on and it is in full "on" position as shown in Fig. 2 where the projection 39a meets the cam 34a. The valve ports may be arranged as shown in Fig. 3, and the valve may be turned passed the cam to the other "on" position for the flow of gas to support a simmering flame. The valve may be turned "off" with continuous rotary movement. The projection 39a snaps into the recess 58 substantially when rotary motion is arrested by the projection 39a, striking the shoulder 12a. The projection 38a functions only on one of the cams and serves this purpose only and performs no function in the locking of the valve.

I claim:

1. In a valve having a body and a rotatable valve member, a stem slidably and non-rotatably secured to the valve member, a cap secured to the body and through which the stem extends, a washer over the stem having cam means thereon and which is keyed to the body, washer means keyed to the stem and having projecting means for functioning on the cam means and for locking the valve member against rotation, a retaining washer keyed to the body and forming a locking notch for receiving the projecting means, an element fixed to the stem and shiftable in the aperture of the retaining washer, spring means for compacting the washers against the element and said washers and elements being disposed within the cap with the element reacting against the cap, some of said projecting means being shiftable out of the locking notch by axial movement of the stem, and some of the projecting means being shiftable past the cam means by flexure of the spring means.

2. In a valve having a body and a rotatable valve member, a stem slidably and non-rotatably secured to the valve member, a cap secured to the body and through which the stem extends, a washer over the stem having cam means thereon and which is keyed to the body, washer means keyed to the stem and having projecting means for functioning on the cam means and for locking the valve member against rotation, a retaining washer keyed to the body and forming a locking notch for receiving the projecting means, an element fixed to the stem and shiftable in the aperture in the retaining washer, spring means for compacting the washers against the element and said washers and elements being disposed within the cap with the element reacting against the cap, some of said projecting means being shiftable out of the locking notch by axial movement of the stem, and some of the projecting means being shiftable past the cam means by flexure of the spring means, and stop means for some of the projecting means for limiting rotary movements of the valve member and stem.

3. In a valve having a body and a rotatable valve manner, a stem slidably and non-rotatably connected to the valve member, a cap through which the stem extends, a plurality of elements around the stem and positioned within the cap and including a washer with cam means keyed to the body, a washer with projection means keyed to the stem with the projection means arranged to function on the cam means, a locking washer keyed to the stem having a locking projection, a retaining washer keyed to the body and having a notch for the locking projection, an element fixed to the stem, spring means for compacting the washers together against the element with the element reacting against the cap, said locking projection being movable out of the notch upon axial shift of the stem against the said spring means, and also the projections of the second washer being movable past the cam means by flexure of the said spring means.

4. In a valve having a body and a rotatable valve member, a cap secured to the body, a stem extending through the cap and slidably and non-rotatably connected to the valve member, means fixed to the valve stem and arranged to abut the inside of the cap, four washers over the valve stem, spring means compacting the washers against the said means, the first washer being positioned next adjacent the valve member and keyed to the body and having cams thereon, the second washer being keyed to the stem and having a projection thereon for functioning on the cams, the third washer being keyed to the stem and having a locking projection thereon, the fourth washer being keyed to the body and having a notch for the said projection, said means arranged to engage the third mentioned washer upon axial shift of the stem against the spring means to shift the first three washers and disengage the locking projection from the locking notch, and stop means for one of the projections on one of the washers keyed to the stem for limiting rotary movements at the stem and valve member.

5. In a valve having a body and a rotatable valve member, a cap secured to the body, a stem extending through the cap and slidably and non-rotatably connected to the valve member, a pair of washers inside the cap and over the valve stem and both keyed to the body, one washer having cam means thereon and the other having a locking notch therein, two other washers disposed between the said pair of washers and both keyed to the stem and one having projecting means for cooperation with the cam means and one having a locking finger for cooperation with the locking notch, an element fixed to the stem and arranged to abut the inside of the cap, a spring surrounding the stem for compacting the two washers which are keyed to the stem against the fixed element when the stem is shifted axially to shift the locking finger out of the said locking notch, and another spring of larger diameter than the first spring and surrounding the stem and compacting all of said washers together.

6. In a valve having a body and a rotatable valve member, a cap secured to the body, a stem extending through the cap and slidably and non-rotatably connected to the valve member, a washer surrounding the stem and keyed to the body and having cam means thereon, a second washer surrounding the stem and keyed thereto and having projecting means for functioning on the cam means, a retaining washer keyed to the body and arranged to form a locking notch for the projecting means of the second washer, an element on the stem arranged to engage the second washer to shift it axially upon axial shift of the stem to disengage the projecting means from the locking notch, and spring means for compacting the washers together against said element.

7. In a valve having a body and a rotatable valve member, a cap secured to the body, a stem extending through the cap and slidably and non-rotatably connected to the valve member, a washer surrounding the stem and keyed to the body and having cam means thereon, a second washer surrounding the stem and keyed thereto and having projecting means for functioning on the cam means, a retaining washer keyed to the body and arranged to form a locking notch for the projecting means of the second washer, an element on the stem arranged to engage the second washer to shift it axially upon axial shift of the stem to disengage the projecting means from the locking notch, a spring surrounding the stem and arranged to yieldably hold the second washer against the third named washer and in locked position, a second spring surrounding the stem and first spring and arranged to hold the first washer yieldably against the second washer.

ERVIN H. MUELLER.